(12) United States Patent
Lin et al.

(10) Patent No.: US 8,111,073 B2
(45) Date of Patent: Feb. 7, 2012

(54) TESTING DEVICE

(75) Inventors: Po-Yu Lin, Taipei-Hsien (TW); Chao-Chien Lee, Taipei-Hsien (JP)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 845 days.

(21) Appl. No.: 12/192,126

(22) Filed: Aug. 15, 2008

(65) Prior Publication Data

US 2009/0045819 A1 Feb. 19, 2009

(30) Foreign Application Priority Data

Aug. 17, 2007 (TW) .............................. 96130603 A

(51) Int. Cl.
*H01H 31/02* (2006.01)

(52) U.S. Cl. ...................................... 324/555

(58) Field of Classification Search .................... 324/555
See application file for complete search history.

(56) References Cited

FOREIGN PATENT DOCUMENTS

| TW | 453442 | 9/2001 |
|---|---|---|
| TW | M314482 | 6/2007 |

OTHER PUBLICATIONS

Chen, TW M314482 Taiwan patent of record, Machine Translation, p. 1-20.*
Tang, TW 453442 Taiwan patent of record, Machine Translation, p. 1-21.*

* cited by examiner

*Primary Examiner* — Thomas Valone
(74) *Attorney, Agent, or Firm* — Altis Law Group, Inc.

(57) ABSTRACT

A testing device (100) includes a main body (20) for supplying power to an electronic product including a space capable of assembling a battery therein, and a housing (10). The main body includes a fixing member (22) and a moving member (24) movable relative to the fixing member. The housing includes a plurality of supporting posts (14) for supporting the main body and at least one driving post (18) for driving the moving member to move relative to the fixing member. When the testing device is in standby mode, a length of the main body is shorter than that of the battery of the electronic product; when the testing device is performing its testing process, the length of the main body is equal to that of the battery of the electronic product.

17 Claims, 4 Drawing Sheets

TESTING DEVICE

BACKGROUND

1. Field of the Invention

The present invention relates to a testing device, and specifically to a testing device to supply power to an electronic product.

2. Description of Related Art

With recent developments in wireless communication technologies, electronic products like mobile phones are in widespread use. In order to improve the quality and performance of mobile phones, quality assurance testing is required. In the testing process, the mobile phones are powered on in order to verify whether they can operate normally.

Conventionally, during the course of testing the mobile phones, a testing probe is electrically connected to the power and directly engages with the power pins of the mobile phone to supply power to the mobile phone. However, the vulnerable power pins of the mobile phone are easily damaged by applied force of the testing probe for such an engagement.

There is, accordingly, a need for an improved testing device.

SUMMARY

In one exemplary embodiment, a testing device includes a main body for supplying power to an electronic product including a space capable of assembling a battery therein, and a housing. The main body includes a fixing member and a moving member movable relative to the fixing member. The housing includes a plurality of supporting posts for supporting the main body and at least one driving post for driving the moving member to move relative to the fixing member. When the testing device is in standby mode, a length of the main body is shorter than that of the battery of the electronic product; when the testing device is performing its testing process, the length of the main body is equal to that of the battery of the electronic product.

Other advantages and novel features will become more apparent from the following detailed description when taken in conjunction with the accompanying drawings, in which:

DETAILED DESCRIPTION OF THE EMBODIMENTS

Figure 1:
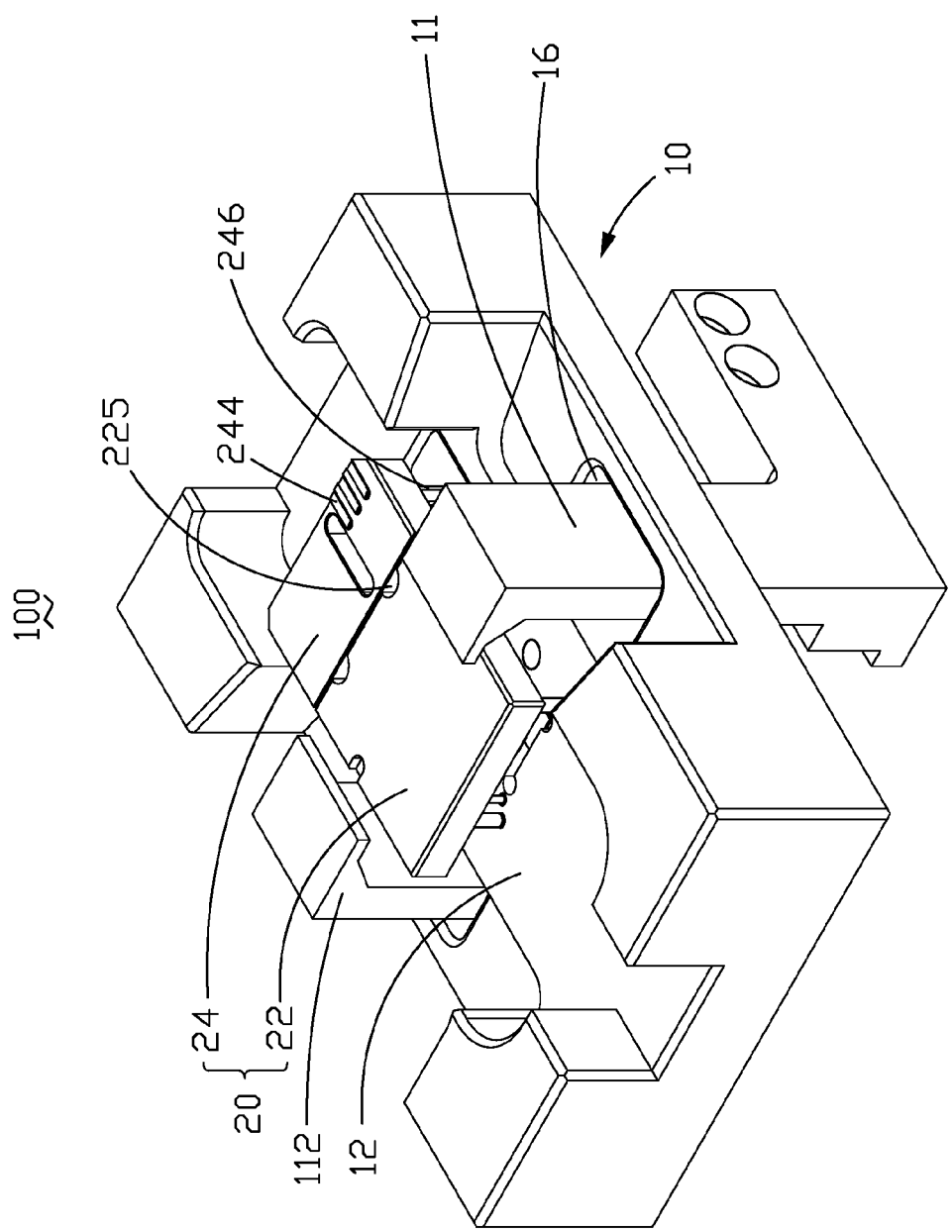
FIG. 1 is an assembled, isometric view of a testing device of an exemplary embodiment of the present invention, the testing device comprising a housing and a main body.

FIG. 1 shows a testing device 100 for supplying power to an electronic product like a mobile phone comprising a space capable of assembling a battery therein for power and a plurality of pins. The testing device 100 comprises a housing 10 and a main body 20 movably mounted on the housing 10. The width of the main body 20 is the same as that of the battery, but the length of the main body 20 is shorter than that of the battery when the testing device 100 is in standby mode. During the testing process, the main body 20 is elongated, and the length of the main body 20 is equal to that of the battery. When the testing device 100 is in standby mode, the main body 20 is defined in its original state, wherein the length of the main body 20 is defined as its original length.

The main body 20 comprises a fixing member 22 and a moving member 24 movable relative to the fixing member 22. The fixing member 22 and the moving member 24 are coplanar. In the embodiment, the fixing member 22 and the moving member 24 are both rectangular.

The moving member 24 comprises a plurality of pins 244 positioned at a distal end thereof, spaced apart from the fixing member 22 and a plurality of poles 246 electrically connected to the pins 244. The poles 246 extrude from the bottom face of the moving member 24 to the housing 10 to supply power to the main body 20.

Figure 2:
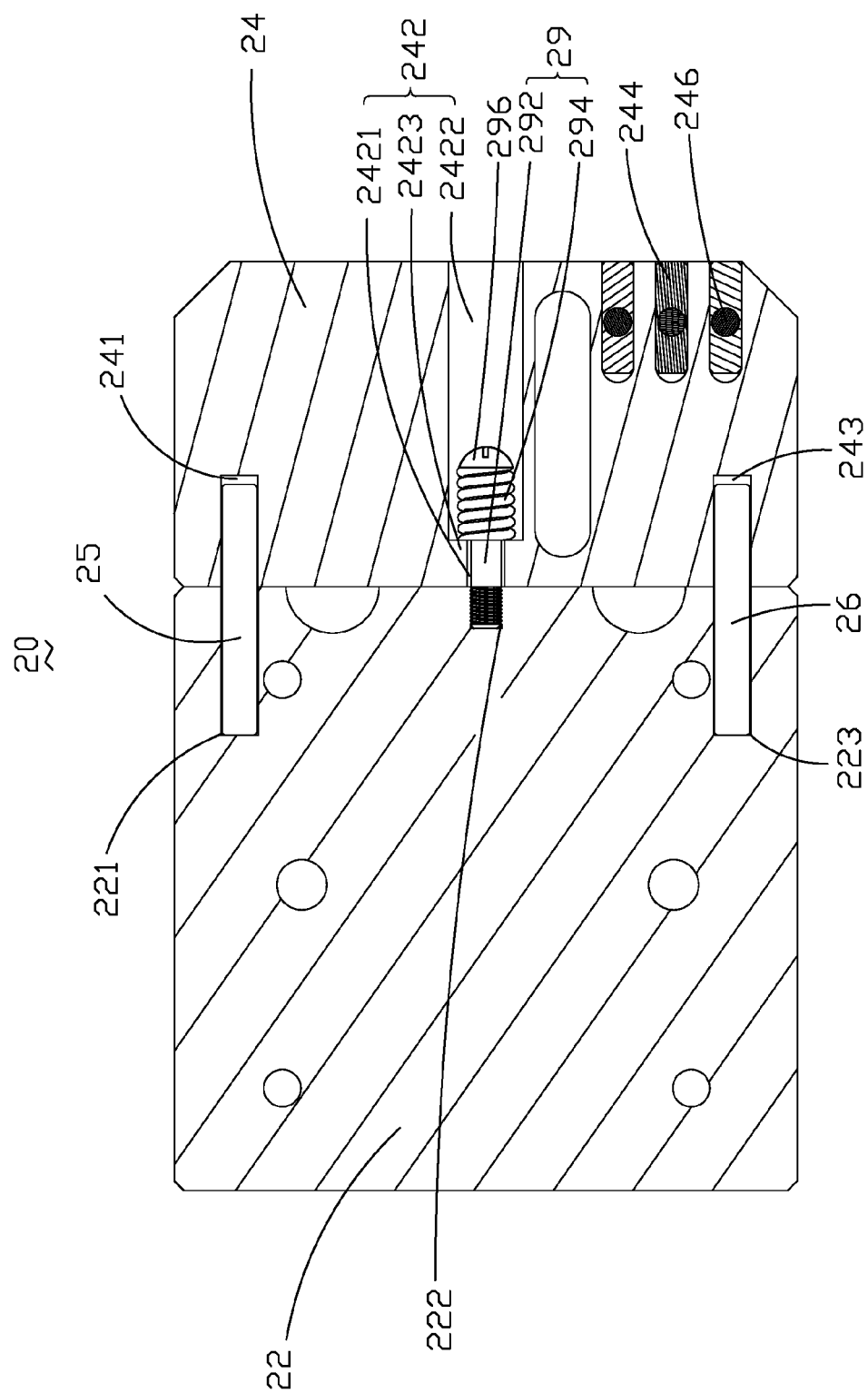
FIG. 2 is a cross-sectional view of the main body of FIG. 1

Referring also to FIG. 2, the fixing member 22 defines a pair of first receiving holes 221, 223 spaced apart from each other and located in an end thereof adjacent to the moving member 24. The moving member 24 defines a pair of second receiving holes 241, 243 spaced apart from each other and located in an end thereof adjacent to the fixing member 22. The first receiving holes 221, 223 correspond to the second receiving holes 241, 243, respectively. The first receiving holes 221, 223 and the second receiving holes 241, 243 are blind holes. A diameter of each first receiving hole 221, 223 is equal to that of each second receiving hole 241, 243.

The main body 20 further comprises a pair of shafts 25, 26. The shaft 25 is received in the first receiving hole 221 and the second receiving hole 241 in a clearance fit, and the shaft 26 is received in the first receiving hole 223 and the second receiving hole 243 in a clearance fit, and as a result, the moving member 24 horizontally moves relative to the fixing member 22.

The fixing member 22 further defines a threaded hole 222 located in the end thereof adjacent to the moving member 24. The moving member 24 further defines a guiding hole 242 located in the end thereof adjacent to the fixing member 22 and corresponding to the threaded hole 222. In other embodiments, the threaded hole 222 is defined in the moving member 24 and the guiding hole 242 is defined in the fixing member 22.

The guiding hole 242 is a stepped hole comprising a connecting hole 2421 adjacent to the fixing member 22, a locating hole 2422 in communication with the connecting hole 2421, and a stepped portion 2423 formed between the connecting hole 2421 and the locating hole 2422. A diameter of the threaded hole 222 is less than that of the connecting hole 2421. A diameter of the locating hole 2422 is greater than that of the connecting hole 2421.

The main body 20 further comprises a resilient member 29 for driving the moving member 24 to move relative to the fixing member 22. The resilient member 29 comprises a shaft 292 and a spring 294. One end of the shaft 292 having thread is retained in the threaded hole 222, while the other end of the shaft 292 is received in the locating hole 2422. The shaft 292 comprises a locating portion 296 formed in the other end thereof. One end of the spring 292 abuts against the locating portion 296, while the other end of the spring 294 abuts against the stepped portion 2423. When the testing device 100 is in the standby mode, the spring 294 is in its original state. When the moving member 24 moves relative to the fixing member 22, the spring 294 is compressed between the locating portion 296 and the stepped portion 2423.

Figure 4:
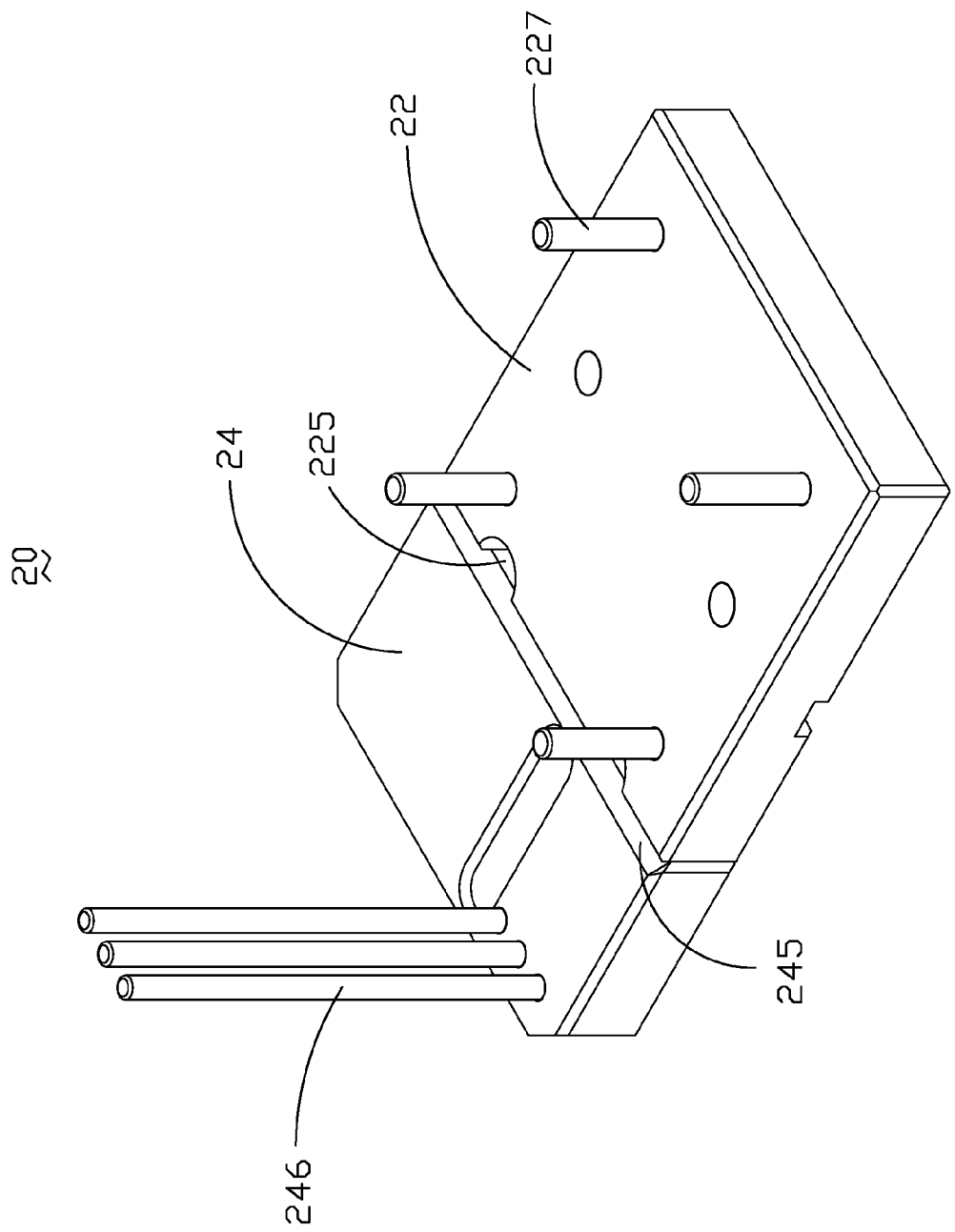
FIG. 4 is an inverted, enlarged view of the main body of FIG. 3.

Referring to FIGS. 1 and 4, the fixing member 22 further comprises a pair of semi-circular cutouts 225 defined in the end thereof adjacent to the moving member 24 and a plurality of locating posts 227. The moving member 24 further comprises a slope 245 located at the end thereof adjacent to the fixing member 22. The slope 245 has a first inclination angle.

Figure 3:
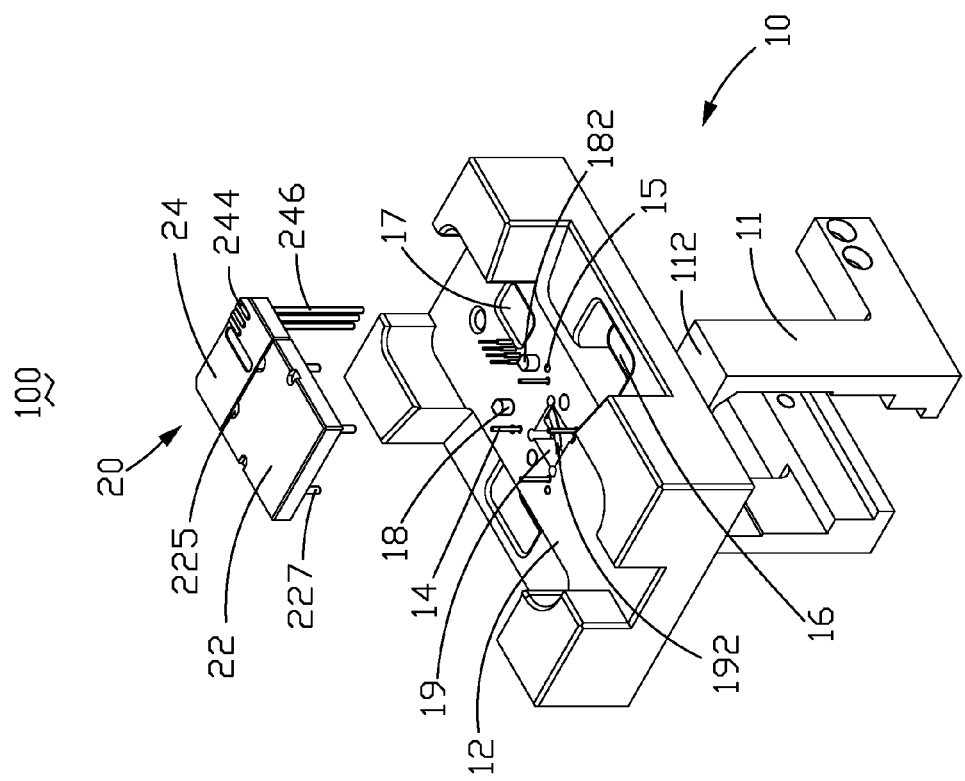
FIG. 3 is an exploded, isometric view of the testing device of FIG. 1.

Referring to FIGS. 1 and 3, the housing 10 comprises a base 12, a plurality of supporting posts 14, and a pair of driving posts 18 corresponding to the cutouts 225 of the fixing member 22. The supporting posts 14 and the driving posts 18 extrude from the surface of the base 12.

The supporting posts 14 are mounted to the fixing member 22 of the main body 20 to support the main body 20. In the embodiment, each of the supporting posts 14 can be resiliently compressed. When an external force is applied to the main body 20, the supporting posts 14 are compressed so that the main body 20 moves vertically, relative to the housing 10. When the supporting posts 14 are in their original state, each of the supporting posts 14 is longer than each of the driving posts 18.

Each of the driving posts 18 comprises a driving portion 182 located at a distal end thereof. In the embodiment, each of the driving portions 182 has a tone-shaped profile and a second inclination angle. The first inclination angle is equal to the second inclination angle. The driving portion 182 and the slope 245 of the moving member 24 collaboratively drive the moving member 24 to move horizontally, relative to the fixing member 22.

The base 12 comprises an opening 17, a room 19, and a plurality of receiving holes 15. The poles 246 of the main body 20 extend through the opening 17 and are electrically connected to a power circuit (not shown). A switch 192 is mounted in the room 19 to control the power circuit. In the embodiment, the switch 192 is a resilient plate. When the resilient plate is compressed, the power circuit supplies power to the main body 20 via the poles 246 of the main body 20 electrically connecting to the power circuit. The locating posts 227 of the main body 20 are received in the receiving holes 15 to ensure that the main body 20 moves vertically, relative to the housing 10.

The housing 10 further comprises a pair of fixing devices 11. Each of the fixing devices 11 comprises a fixing portion 112 for fixing the main body 20 in the space of the tested mobile phone. The base 12 defines a pair of rooms 16 located in opposite sides thereof so that the fixing portions 112 can extend through the base 12 to fix the tested mobile phone. In the embodiment, the fixing devices 11 are made of resilient material, such as, hard rubber or plastic steel material.

In assembly, the locating posts 227 of the main body 20 are received in the receiving holes 15. The poles 246 of the main body 20 extend through the opening 17 of the base 12. The supporting posts 14 of the base 12 are mounted to the main body 20. The fixing devices 11 extend through the rooms 16 of the base 12.

In use, when the tested mobile phone is pushed downwardly by an external force, and corresponding force is applied to the housing 10 so that the fixing devices 11 are compressed, and the supporting posts 14 of the housing 10 are compressed, and as a result, the main body 20 moves vertically, relative to the housing 10 in a first direction with the driving portion 182 of the driving posts 18 of the base 10 engaging with the slope 245 of the moving member 24 and driving the moving member 24 to horizontally move apart from the fixing member 22, thereby gradually elongating the main body 20. When the length of the main body 20 is equal to that of the battery, the fixing devices 11 decompress and fix the main body 20 in the space of the tested mobile phone with the pins 244 of the main body 20 electrically and mechanically connecting to the pins of the tested mobile phone. As a result, the testing device 100 supplies power to the tested mobile phone. At this stage, the external force applied on the tested mobile phone can be released. The main body 20 is supplied power by the power circuit and the mobile phone is tested.

After the testing process has been completed, the tested mobile phone is unlocked from the fixing devices 11, the supporting posts 14 of the housing 10 decompress and drive the main body 20 to vertically move in a second direction opposite and parallel to the first direction back to its original state, and the spring 294 decompresses and drives the main body 20 back to its original length.

While exemplary embodiments have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A testing device for supplying power to an electronic product, the electronic product comprising a battery, the testing device comprising:
    a main body for supplying the power to the electronic product, the main body comprising a fixing member and a moving member movable relative to the fixing member, the fixing member comprising at least one cutout defined in an end thereof adjacent to the moving member; and
    a housing comprising a plurality of supporting posts for supporting the main body and at least one driving post for driving the moving member to move relative to the fixing member, the at least one driving post comprising a driving portion corresponding to the cutout;
    wherein, when the testing device is in standby mode, a length of the main body is shorter than that of the battery; when the testing device is in test, the length of the main body is equal to that of the battery.

2. The testing device of claim 1, wherein the housing comprises a base and at least one fixing device extending through the base to fix the electronic product.

3. The testing device of claim 1, wherein the moving member comprises a slope located at an end thereof adjacent to the fixing member and having a first inclination angle, and the driving portion has a second inclination angle equal to the first inclination angle.

4. The testing device of claim 3, wherein the driving portion of the housing and the slope of the moving member collaboratively drive the moving member to move relative to the fixing member.

5. The testing device of claim 1, wherein the main body further comprises a resilient member received in one of the moving member and the fixing member to drive the moving member to move relative to the fixing member.

6. The testing device of claim 1, wherein the fixing member comprises at least one first receiving hole, and the moving member comprises at least one second receiving hole corresponding to the at least one first receiving hole.

7. The testing device of claim 6, wherein the main body further comprises at least one shaft received in the at least one first receiving hole and the at least one second receiving hole to connect the fixing member with the moving member.

8. A testing device assembly comprising:
    an electronic product comprising a space and a battery received in the space, and comprising a plurality of first pins;
    a housing for fixing the electronic product; and
    a main body for supplying power to the electronic product and movably mounted on the housing, the main body comprising a fixing member and a moving member movable relative to the fixing member, the moving member comprising a plurality of second pins, the fixing member comprising at least one cutout defined in an end thereof adjacent to the moving member and at least one driving post for driving the moving member to move relative to the fixing member, the at least one diving post comprises a driving portion corresponding to the cutout; wherein when the main body is in standby mode, a length of the main body is shorter than that of the battery; when the main body is in test, the length of the main body is equal to that of the battery and the second pins of the main body mechanically and electrically connect to the first pins of the electronic product.

9. The testing device assembly of claim 8, wherein the housing comprises a plurality of supporting posts for supporting the main body.

10. The testing device assembly of claim 8, wherein the housing comprises a base and at least one fixing device extending through the base to fix the electronic product.

11. The testing device assembly of claim 8, wherein the moving member comprises a slope located at an end thereof adjacent to the fixing member and having a first inclination angle, and the driving portion has a second inclination angle equal to the first inclination angle.

12. The testing device assembly of claim 11, wherein the driving portion of the housing and the slope of the moving member collaboratively drive the moving member to move relative to the fixing member.

13. The testing device assembly of claim 8, wherein the main body further comprises a resilient member received in one of the moving member and the fixing member to drive the moving member to move relative to the fixing member.

14. The testing device assembly of claim 8, wherein the fixing member comprises at least one first receiving hole, and the moving member comprises at least one second receiving hole corresponding to the at least one first receiving hole.

15. The testing device assembly of claim 14, wherein the main body further comprises at least one shaft received in the at least one first receiving hole and the at least one second receiving hole to connect the fixing member with the moving member.

16. An assembly for testing comprising:
an electronic product comprising a space and a battery received in the space for power; and
a testing device comprising a main body for supplying power to said electronic product during testing, said main body removably receivable in said space of said electronic product and comprising a plurality of pins formed at a distal end thereof, said plurality of pins being movable relative to said electronic product between a first position where said plurality of pins normally engages with said electronic product for power connection, and a second position where said plurality of pins is spaced and disengaged from said electronic product, said main body further comprising a fixing member and a moving member movable relative to said fixing member, said fixing member comprising at least one cutout defined in an end thereof adjacent to said moving member and at least one driving post for driving the moving member to move relative to the fixing member, the at least one driving post comprising a driving portion corresponding to the cutout.

17. The assembly of claim 16, wherein said plurality of pins is formed on said moving member.

* * * * *